US012585978B2

(12) United States Patent
Oltramari et al.

(10) Patent No.: US 12,585,978 B2
(45) Date of Patent: Mar. 24, 2026

(54) KNOWLEDGE-DRIVEN AND SELF-SUPERVISED SYSTEM FOR QUESTION-ANSWERING

(71) Applicant: Robert Bosch GmbH, Stuttgart (DE)

(72) Inventors: Alessandro Oltramari, Pittsburgh, PA (US); Jonathan Francis, Pittsburgh, PA (US); Kaixin Ma, Pittsburgh, PA (US); Filip Ilievski, Marina Del Rey, CA (US)

(73) Assignee: Robert Bosch GmbH, Stuttgart (DE)

( * ) Notice: Subject to any disclaimer, the term of this patent is extended or adjusted under 35 U.S.C. 154(b) by 1128 days.

(21) Appl. No.: 17/091,499

(22) Filed: Nov. 6, 2020

(65) Prior Publication Data

US 2022/0147861 A1     May 12, 2022

(51) Int. Cl.
| | |
|---|---|
| *G06N 20/00* | (2019.01) |
| *G06F 16/9536* | (2019.01) |
| *G06N 5/02* | (2023.01) |

(52) U.S. Cl.
CPC ......... *G06N 20/00* (2019.01); *G06F 16/9536* (2019.01); *G06N 5/02* (2013.01)

(58) Field of Classification Search
CPC ....... G06F 16/9536; G06N 5/02; G06N 20/00
See application file for complete search history.

(56) References Cited

U.S. PATENT DOCUMENTS

| | | | |
|---|---|---|---|
| 2015/0325133 A1* | 11/2015 | Gaglani ................... | G09B 7/00 434/322 |
| 2018/0061256 A1* | 3/2018 | Elchik ...................... | G09B 5/02 |
| 2018/0260472 A1* | 9/2018 | Kelsey .................... | G06F 40/56 |

FOREIGN PATENT DOCUMENTS

| | | | |
|---|---|---|---|
| CN | 110334190 A | * 10/2019 | |
| CN | 110427467 A | * 11/2019 | ......... G06F 16/3329 |

(Continued)

OTHER PUBLICATIONS

Yuni Susanti etc., "Automatic distractor generation for multiple-choice English vocabulary questions", published in Research and Practice in Technology Enhanced Learning (2018), retrieved Feb. 9, 2024. (Year: 2018).*

(Continued)

*Primary Examiner* — Shourjo Dasgupta
(74) *Attorney, Agent, or Firm* — Kathy Takeguchi

(57) ABSTRACT

A computer-implemented system and method relates to natural language processing. The computer-implemented system and method are configured to obtain a current data structure from a global knowledge graph, which comprises various knowledge graphs. The current data structure includes a current head element, a current relationship element, and a current tail element. A sentence is obtained based on the current data structure. A question is generated by removing the current tail element from the sentence. A correct answer is generated for the question. The correct answer includes the current tail element. A pool of data structures is extracted from the global knowledge graph based on a set of distractor criteria. The set of distractor criteria ensures that each extracted data structure includes the current relationship element. Tail elements from the pool of data structures are extracted to create a pool of distractor candidates. A set of distractors are selected from the pool of distractor candidates. A query task is created that includes the question and a set of response options. The set of response options include the correct answer and the set of distractors. The query task is included in a training set. A machine learning system is trained with the training set. The machine learning system is configured to receive the query task and respond to the question with a predicted answer that is selected from among the set of response options.

17 Claims, 7 Drawing Sheets

(56) References Cited

FOREIGN PATENT DOCUMENTS

| | | | | | |
|---|---|---|---|---|---|
| CN | 110502621 A | * | 11/2019 | ......... | G06F 16/3329 |
| CN | 111125328 A | * | 5/2020 | ......... | G06F 16/3329 |
| CN | 110569368 B | * | 11/2022 | ........... | G06F 16/367 |
| WO | WO-2016105182 A1 | * | 6/2016 | ............... | G09B 7/06 |
| WO | WO-2018161917 A1 | * | 9/2018 | ............. | G06F 40/10 |
| WO | WO-2018165579 A1 | * | 9/2018 | ............. | G06F 40/30 |
| WO | WO-2020072194 A2 | * | 4/2020 | ............. | G09B 19/00 |

OTHER PUBLICATIONS

Farhad Moghimifar etc., "COSMO: Conditional SEQ2SEQ-based Mixture Model for Zero-Shot Commonsense Question Answering", published in Arxiv on Nov. 2, 2020, retrieved Feb. 9, 2024. (Year: 2020).*

Cheng Zhang etc., "Generating Adequate Distractors for Multiple-Choice Questions", published in Arxiv on Oct. 23, 2020, retrieved Feb. 9, 2024. (Year: 2020).*

Yifan Gao etc., "Generating Distractors for Reading Comprehension Questions from Real Examinations", published in Arxiv on Sep. 8, 2018, retrieved Feb. 9, 2024. (Year: 2018).*

Maha Al-Yahya, "Ontology-Based Multiple Choice Question Generation", published in The Scientific World Journal, vol. 2014, Article ID 274949, 9 pages, retrieved Feb. 9, 2024. (Year: 2014).*

Gerard Deepak etc., "OntoQuest: An Ontological Strategy for Automatic Question Generation for e-assessment using Static and Dynamic Knowledge", published in 2019 Fifteenth International Conference on Information Processing (ICINPRO) (pp. 1-6), retrieved Feb. 9, 2024. (Year: 2019).*

A. Santhanavijayan, etc., "Automatic generation of multiple choice questions for e-assessment", published in Int. J. Signal and Imaging Systems Engineering, vol. 10, No. 1/2, 2017, retrieved Oct. 3, 2024. (Year: 2017).*

Akhil Killawala, etc., "Computational Intelligence Framework for Automatic Quiz Question Generation", published in 2018 IEEE International Conference on Fuzzy Systems, Jul. 7-Jul. 13, 2018, Rio de Janeiro, Brazil, retrieved Oct. 3, 2024. (Year: 2018).*

Jeroen Offerijns, etc., "Better Distractions: Transformer-based Distractor Generation and Multiple Choice Question Filtering", published Oct. 19, 2020 via arXiv, retrieved Oct. 3, 2024. (Year: 2020).*

Chonlathorn Kwankajornkiet, etc., "Automatic Multiple-Choice Question Generation from Thai Text", published via 2016 13th International Joint Conference on Computer Science and Software Engineering, retrieved Oct. 3, 2024. (Year: 2016).*

Itziar Aldabe, etc., "The Question Model inside Ariklturri", published via 7th IEEE Conference on Advanced Learning Technologies, 2007, retrieved Oct. 3, 2024. (Year: 2007).*

Yifan Gao, etc., "Generating Distractors for Reading Comprehension Questions from Real Examinations", published via arXiv on Dec. 18, 2018, retrieved Oct. 3, 2024. (Year: 2018).*

Min-Huang Chu, etc., "A Learning-based Framework to Utilize E-HowNet Ontology and Wikipedia Sources to Generate Multiple-Choice Factual Questions", published via 2012 Conference on Technologies and Applications of Artificial Intelligence, retrieved Oct. 3, 2024. (Year: 2012).*

Hoang Long Nguyen, etc., "Knowledge graph fusion for smart systems: A Survey", published online on Mar. 31, 2020, published in Information Fusion, vol. 61, pp. 56-70, retrieved Feb. 17, 2025. (Year: 2020).*

Apoorv Saxena, etc., "Improving Multi-hop Question Answering over Knowledge Graphs using Knowledge Base Embeddings", published via the Proceedings of the 58th Annual Meeting of the Association for Computational Linguistics, pp. 4498-4507, Jul. 5-10, 2020, retrieved Feb. 17, 2025. (Year: 2020).*

Hao Wei, "Combining knowledge graphs, quickly and accurately", published on Mar. 19, 2020 to https://www.amazon.science/blog/combining-knowledge-graphs-quickly-and-accurately, retrieved Feb. 17, 2025. (Year: 2020).*

Xiaojuan Zhao, etc., "Multi-source knowledge fusion: a survey", published online on Apr. 8, 2020 to https://link.springer.com/article/10.1007/s11280-020-00811-0, retrieved Feb. 17, 2025. (Year: 2020).*

ScienceDirect, "Generalization Performance", published on Dec. 1, 2018 to https://www.sciencedirect.com/topics/computer-science/generalization-performance, retrieved Oct. 28, 2025. (Year: 2018).*

Zhiqiang Gong, etc., "Diversity in Machine Learning", published May 15, 2019 to arXiv, retrieved Oct. 28, 2025. (Year: 2019).*

Jason Brownlee, "Overfi tting and Underfi tting With Machine Learning Algorithms", published on Aug. 12, 2019 to https://machinelearningmastery.com/overfitting-and-underfitting-with-machine-learning-algorithms, retrieved Oct. 28, 2025. (Year: 2019).*

"5.8 Model tuning and avoiding overfitting", published on May 11, 2019 to https://compgenomr.github.io/book/model-tuning-and-avoiding-overfitting.html, retrieved Oct. 28, 2025. (Year: 2019).*

Md Mubasir, "Don't Overfit! II—How to avoid Overfitting in your Machine Learning and Deep Learning Models", published on Jul. 27, 2020 to https://towardsdatascience.com/dont-overfit-ii-how-to-avoid-overfitting-in-your-machine-learning-and-deep-learningmodels-2ff903f4b36a, retrieved Oct. 28, 2025. (Year: 2020).*

Conzheng Song, etc., "Machine Learning Models that Remember Too Much", published via CCS '17, Oct. 30-Nov. 3, 2017, Dallas, TX, USA, retrieved Oct. 28, 2025. (Year: 2017).*

Banerjee et al., "Self-Supervised Knowledge Triplet Learning for Zero-Shot Question Answering," arXiv:2005.00316v2 [cs.CL] Sep. 17, 2020, pp. 1-12.

Bauer et al., "Commonsense for Generative Multi-Hop Question Answering Tasks," arXiv:1809.06309v3 [cs.CL] Jun. 1, 2019, 22 pages.

Bhagavatula et al., "Abductive Commonsense Reasoning," arXiv:1908.05739v2 [cs.CL], ICLR 2020, Feb. 14, 2020, pp. 1-18.

Bisk et al., "PIQA: Reasoning about Physical Commonsense in Natural Language," Association for the Advancement of Artificial Intelligence (www.aaai.org), arXiv:1911.11641v1 [cs.CL], Nov. 26, 2019, 9 pages.

Bosselut et al., "Dynamic Knowledge Graph Construction for Zero-shot Commonsense Question Answering," arXiv:1911.03876v1 [cs.CL], Nov. 10, 2019, 12 pages.

Bras et al., "Adversarial Filters of Dataset Biases", Proceedings of the 37th International Conference on Machine Learning, Vienna, Austria, PMLR 119, arXiv:2002.04108v3 [cs.LG], Jul. 11, 2020, 14 pages.

Devlin et al., "BERT: Pre-training of Deep Bidirectional Transformers for Language Understanding," arXiv:1810.04805v2 [cs.CL], May 24, 2019, 16 pages.

Gordon et al., "SemEval-2012 Task 7: Choice of Plausible Alternatives: An Evaluation of Commonsense Causal Reasoning," First Joint Conference on Lexical and Computational Semantics (*SEM), Montreal, Canada, Jun. 7-8, 2012, pp. 394-398.

Ilievski et al., "Consolidating Commonsense Knowledge," arXiv:2006.06114v2 [cs.AI], Jun. 22, 2020, 14 pages.

Kocijan et al., "A Surprisingly Robust Trick for the Winograde Schema Challenge," arXiv:1905.06290v2 [cs.CL], Aug. 4, 2019, 6 pages.

Krippendorff, "Content Analysis: An Introduction to its Methodology," Second Edition, Sage Publications.

Krishna et al., "Visual Genome: Connecting Language and Vision Using Crowdsourced Dense Image Annotations," International Journal of Computer Vision, arXiv:1602.07332v1 [cs.CV], Feb. 23, 2016, pp. 1-44.

Levine et al., "SenseBERT: Driving Some Sense into BERT," arXiv:1908.05646v2 [cs.CL], May 18, 2020, 12 pages.

Li et al., "Harvesting and Refining Question-Answer Pairs for Unsupervised QA," arXiv:2005.02925v1 [cs.CL], May 6, 2020, 10 pages.

Lin et al., "KagNet: Knowledge-Aware Graph Networks for Commonsense Reasoning," arXiv:1909.02151v1 [cs.CL], Sep. 4, 2019, 11 pages.

Liu et al., "RoBERTa: A Robustly Optimized BERT Pretraining Approach," arXiv:1907.11692v1 [cs.CL], Jul. 26, 2019, 13 pages.

Liu et al., "K-BERT: Enabling Language Representation with Knowledge Graph," arXiv:1909.07606v1 [cs.CL], Sep. 17, 2019, AAAI, 8 pages.

(56) References Cited

OTHER PUBLICATIONS

Ma et al., "Towards Generalizable Neuro-Symbolic Systems for Commonsense Question Answering," arXiv:1910.14087v1 [cs.CL], Oct. 30, 2019, 11 pages.

Miller, "WordNet: A Lexical Database for English," Communications of the ACM, Nov. 1995, vol. 38, No. 11, pp. 39-41.

Mitra et al., "How Additional Knowledge can Improve Natural Language Commonsense Question Answering?," arXiv:1909.08855v3 [cs.CL], Apr. 17, 2020, 14 pages.

Murphy, Amazon.com Booklisting—Semantic Relations and the Lexicon: Antonymy, Synonymy and other Pardigms (9780521780674).

Niu et al., "A Self-Training Method for Machine Reading Comprehension with Soft Evidence Extraction," Proceedings of the 58th Annual Meeting of the Association for Computational Linguistics, Jul. 5-10, 2020, pp. 3916-3927.

Peters et al., "Knowledge Enhanced Contextual Word Representations," Proceedings of the 2019 Conference on Empirical Methods in Natural Language Processing and the 9th International Joint Conference on Natural Language Processing, Hong Kong, China, Nov. 3-7, 2019, pp. 43-54.

Petroni et al., "Language Models as Knowledge Bases?," arXiv:1909.01066v2 [cs.CL], Sep. 4, 2019, 11 pages.

Radford et al., "Language Models are Unsupervised Multitask Learners," 2019, 24 pages.

Rajpurkar et al., "SQuAD: 100,000+ Questions for Machine Comprehension of Text," arXiv:1606.05250v3 [cs.CL], Oct. 11, 2016, 10 pages.

Reimers et al., "Making Monolingual Sentence Embeddings Multilingual Using Knowledge Distillation," arXiv:2004.09813v2 [cs.CL], Oct. 5, 2020, 14 pages.

Richardson et al., "What Does My QA Model Know? Devising Controlled Probes Using Expert Knowledge," arXiv:1912.13337v2 [cs.CL], Sep. 1, 2020, 16 pages.

Sakaguchi et al., "WinoGrande: An Adversarial Winograd Schema Challenge at Scale", arXiv:1907.10641v2 [cs.CL], Nov. 21, 2019, 9 pages.

Sap et al., "Atomic: An Atlas of Machine Commonsense for If-Then Reasoning," Association for the Advancement of Artificial Intelligence, arXiv:1811.00146v3 [cs.CL], Feb. 7, 2019, 9 pages.

Sap et al., "Social IQA: Commonsense Reasoning about Social Interactions," Proceedings of the 2019 Conference on Empirical Methods in Natural Language Processing and the 9th International Joint Conference on Natural Language Processing, Hong Kong, China, Nov. 3-7, 2019, Association for Computational Linguistics, pp. 4463-4473.

Schwartz et al., "Unsupervised Commonsense Question Answering with Self-Talk," arXiv:2004.05483v2 [cs.CL], Sep. 15, 2020, 15 pages.

Speer et al., "ConceptNet 5.5: An Open Multlingual Graph of General Knowledge," Association for the Advancement of Artificial Intelligence, arXiv:1612.03975v2 [cs.CL], Dec. 11, 2018, 9 pages.

Talmor et al., "Commonsenseqa: A Question Answering Challenge Targeting Commonsense Knowledge," Proc. of NAACL, arXiv:1811.00937v2 [cs.CL], Mar. 15, 2019, 10 pages.

Talmor et al., "Teaching Pre-Trained Models to Systematically Reason Over Implicit Knowledge," arXiv:2006.06609v2 [cs.CL], Jun. 19, 2020, 13 pages.

Tamborrino et al., "Pre-Training is (Almost) All You Need: An Application to Commonsense Reasoning," arXiv:2004.14074v1 [cs.CL], Apr. 29, 2020, 10 pages.

Vrandecic et al., "Wikidata: A Free Collaborative Knowledge Base", Communications of the ACM, 2014, pp. 1-7.

Wolf et al., "Transformers: State-of-the-Art Natural Language Processing," arXiv:1910.03771v5 [cs.CL], Jul. 14, 2020, 8 pages.

Xia et al., "Incorporating Relation Knowledge into Commonsense Reading Comprehension with Multi-task Learning," CIKM '19, Nov. 3-7, 2019, Beijing, China, Association for Computing Machinery, arXiv:1908.04530v2 [cs.CL], Sep. 5, 2019, 4 pages.

Yang et al., "Generative Data Augmentation for Commonsense Reasoning", arXiv:2004.11546v2 [cs.CL], Oct. 6, 2020, 18 pages.

Ye et al., "Align, Mask and Select: A Simple Method for Incorporating Commonsense Knowledge into Language Representation Models," arXiv:1908.06725v5 [cs.CL], May 6, 2020, 10 pages.

Zellers et al., "HellaSwag: Can a Machine Really Finish Your Sentence?," Proceedings of the 57th Annual Meeting of the Association for Computational Linguistics, Florence, Italy, Jul. 28-Aug. 2, 2019, Association for Computational Linguistics, pp. 4791-4800.

Zhang et al., "ERNIE: Enhanced Language Representation with Informative Entities", Proceedings of the 57th Annual Meeting of the Association for Computational Linguistics, Florence, Italy, Jul. 28-Aug. 2, 2019, Association for Computational Linguistics, pp. 1441-1451.

Zhong et al, "Improving Question Answering by Commonsense-Based Pre-Training," arXiv:1809.03568v3 [cs.CL], Mar. 1, 2019, 7 pages.

Zhou et al, "Evaluating Commonsense in Pre-Trained Language Models", Association for the Advancement of Artificial Intelligence, arXiv:1911.11931v1 [cs.CL], Nov. 27, 2019, 8 pages.

Patra et al., "A hybrid approach for automatic generation of named entity distractors for muitipie choice questions," Educational and Information Technologies, (2019) 24: pp. 973-993.

Bhatia et al., "Automatic Generation of Multiple Choice Questions Using Wikipedia," P. Maji et al. (Eds.): PReMI 2013, LNCS 8251, pp. 733-738.

Offerjins et al., "Better Distractions: Transformer-based Distractor Generation and Multiple Choice Question Filtering," arXiv:2010.09598, Oct. 2020, pp. 1-10.

Seyler et al., "Knowledge Questions from Knowledge Graphs," ICTIR 17, Oct. 1-4, 2017, Amsterdam, The Netherlands, 2017 ACM, pp. 11-18.

* cited by examiner

300

┌─────────────────────────────────────────┐
│ OBTAIN A GLOBAL KNOWLEDGE GRAPH BASED ON  │ ⟋302
│      VARIOUS KNOWLEDGE GRAPHS             │
└─────────────────────────────────────────┘
                    │
                    ▼
┌─────────────────────────────────────────┐
│      OBTAIN A TRIPLE (h, r, t) FROM THE   │ ⟋304
│          GLOBAL KNOWLEDGE GRAPH           │
└─────────────────────────────────────────┘
                    │
                    ▼

⟋306                              ⟋308
         ◇ SENTENCE ◇          NO      ┌──────────────────┐
         ◇ ASSOCIATED WITH ◇ ────────► │  GENERATE A      │
         ◇ THE TRIPLE? ◇               │  SENTENCE BASED  │
                                       │  ON THE TRIPLE   │
                    │                  └──────────────────┘
                   YES
                    ▼
                                                      ⟋310
┌──────────────────────────────────────────────────────┐
│            GENERATE QUESTION-ANSWER PAIR               │
│  ┌─────────────────────┐  ┌─────────────────────────┐ │
│  │ GENERATE QUESTION BY│  │ GENERATE CORRECT ANSWER │ │
│  │ REMOVING TAIL OF    │  │ BY EXTRACTING TAIL OF THE│ │
│  │ THE SENTENCE        │  │ SENTENCE                 │ │
│  └─────────────────────┘  └─────────────────────────┘ │
└──────────────────────────────────────────────────────┘
                    │
                    ▼
              ⟋312                              ⟋314
         ◇ DISTINCT TOKENS ◇     NO    ┌──────────────────────┐
         ◇ FOR HEAD AND ◇ ───────────► │ FILTER OUT THE        │
         ◇ CORRECT ANSWER ? ◇          │ QUESTION-ANSWER PAIR  │
                                       └──────────────────────┘
                    │
                   YES
                    ▼
              ( SEE FIG. 3B )

FIG. 3A

KNOWLEDGE-DRIVEN AND SELF-SUPERVISED SYSTEM FOR QUESTION-ANSWERING

FIELD

This disclosure relates generally to machine learning systems, and more specifically to machine learning systems configured for natural language processing.

BACKGROUND

In general, there are some machine learning systems that include neural language models, which are configured for question-answering tasks. However, there is some concern that these neural language models overfit to the specific question-answering tasks in which they were trained without learning to utilize external knowledge and/or perform general semantic reasoning. More specifically, these neural language models tend to overfit to a specific question-answer format of the training data and/or a specific knowledge type of the training data. As such, these neural language models may fail to make reliable predictions for other question-answering tasks, which may differ with respect to format, knowledge type, or both format and knowledge type.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to pre-training (or training) a machine learning system. The computer-implemented method includes obtaining a current data structure from a global knowledge graph. The global knowledge graph includes a combination of various knowledge graphs. The current data structure includes a current head element, a current relationship element, and a current tail element. The computer-implemented method includes obtaining a sentence corresponding to the current data structure. The computer-implemented method includes generating a question by removing the current tail element from the sentence. The computer-implemented method includes generating a correct answer to the question. The correct answer includes the current tail element. The computer-implemented method includes extracting a pool of data structures from the global knowledge graph based on a set of distractor criteria. Each extracted data structure includes the current relationship element. The computer-implemented method includes extracting tail elements from the pool of data structures to create a pool of distractor candidates. The computer-implemented method includes selecting a set of distractors from the pool of distractor candidates. The computer-implemented method includes creating a query task that includes the question and a set of response options. The set of response options include the correct answer and the set of distractors. The computer-implemented method includes creating a training set that includes at least the query task. The computer-implemented method includes training the machine learning system with the training set, wherein the machine learning system is configured to receive the query task and respond to the question with a predicted answer that is selected from among the set of response options.

According to at least one aspect, a data processing system includes at least one non-transitory computer readable medium and a processing system. The non-transitory computer readable medium includes at least a neuro-symbolic framework. The neuro-symbolic framework includes computer readable data. The processing system includes at least one processor that is operably connected to the non-transitory computer readable medium. The processor is configured to execute the computer readable data to implement a method. The method includes obtaining a current data structure from a global knowledge graph. The global knowledge graph includes a combination of various knowledge graphs. The current data structure includes a current head element, a current relationship element, and a current tail element. The method includes obtaining a sentence corresponding to the current data structure. The method includes generating a question by removing the current tail element from the sentence. The method includes generating a correct answer to the question. The correct answer includes the current tail element. The method includes extracting a pool of data structures from the global knowledge graph based on a set of distractor criteria. Each extracted data structure includes the current relationship element. The method includes extracting tail elements from the pool of data structures to create a pool of distractor candidates. The method includes selecting a set of distractors from the pool of distractor candidates. The method includes creating a query task that includes the question and a set of response options. The set of response options includes the correct answer and the set of distractors. The method includes creating a training set that includes at least the query task. The method includes training a machine learning system with the training set, wherein the machine learning system is configured to receive the query task and respond to the question with a predicted answer that is selected from among the set of response options.

According to at least one aspect, a computer product includes at least one non-transitory computer readable storage device that includes computer-readable data, which when executed by one or more processors, is operable to cause the one or more processors to implement a method. The method includes obtaining a current data structure from a global knowledge graph. The global knowledge graph includes a combination of various knowledge graphs. The current data structure includes a current head element, a current relationship element, and a current tail element. The method includes obtaining a sentence corresponding to the current data structure. The method includes generating a question by removing the current tail element from the sentence. The method includes generating a correct answer to the question. The correct answer includes the current tail element. The method includes extracting a pool of data structures from the global knowledge graph based on a set of distractor criteria. Each extracted data structure includes the current relationship element. The method includes extracting tail elements from the pool of data structures to create a pool of distractor candidates. The method includes selecting a set of distractors from the pool of distractor candidates. The method includes creating a query task. The query task includes the question and a set of response options. The set of response options include the correct answer and the set of distractors. The method includes creating a training set that includes at least the query task. The method includes training the machine learning system with the training set. The machine learning system is configured to receive the query task and respond to the question with a predicted answer that is selected from among the set of response options.

These and other features, aspects, and advantages of the present invention are discussed in the following detailed description in accordance with the accompanying drawings throughout which like characters represent similar or like parts.

BRIEF DESCRIPTION OF THE DRAWINGS

FIGS. 3A and 3B represent a flow chart of an example of method for generating a query task according to an example embodiment of this disclosure.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
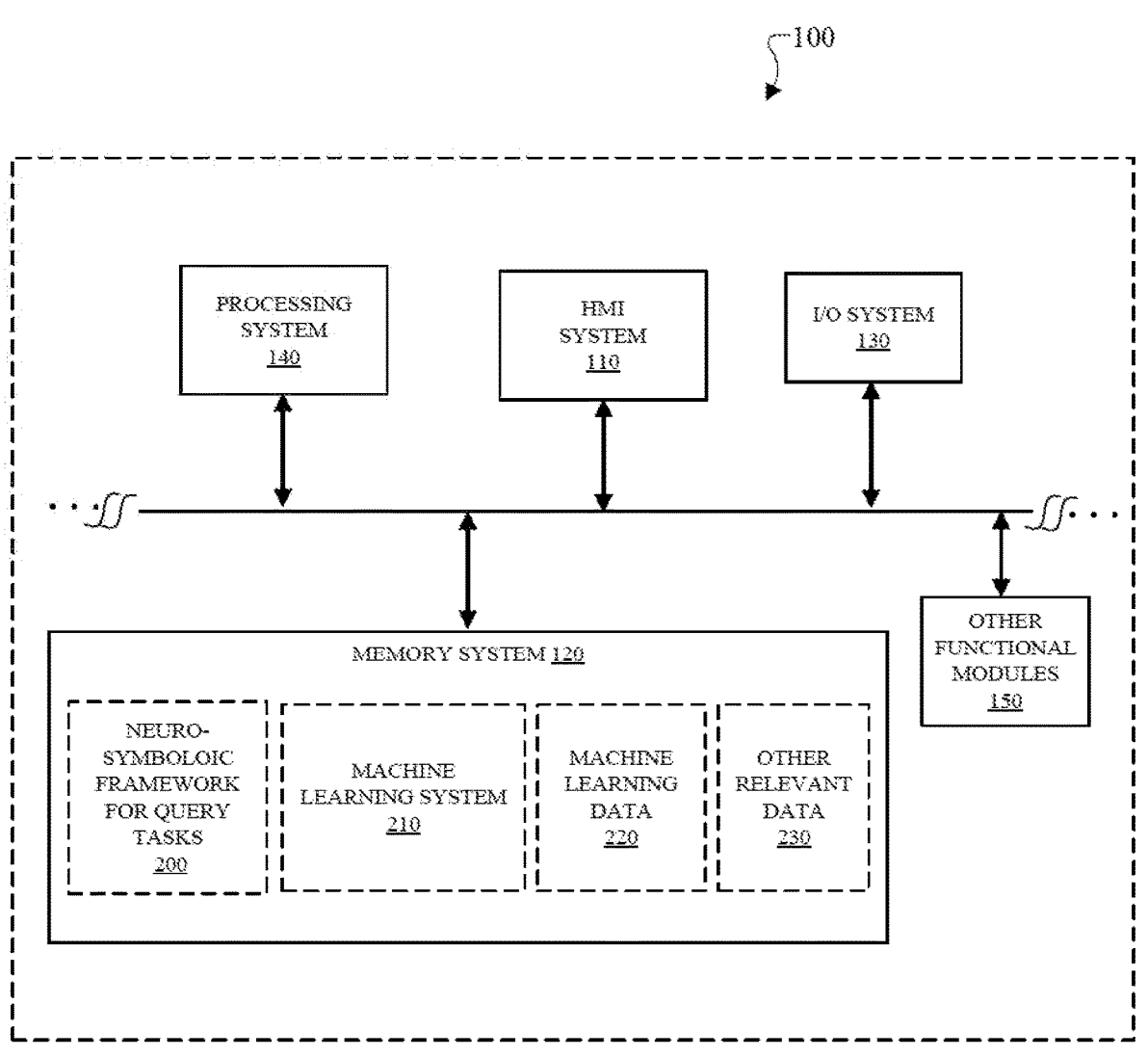
FIG. 1 is a diagram of an example of a system with a neuro-symbolic framework for query tasks according to an example embodiment of this disclosure.

FIG. 1 is a diagram of an example of a system 100 with a neuro-symbolic framework 200 for query tasks according to an example embodiment. The system 100 is configured to pre-train (or train) the machine learning system 210 via the neuro-symbolic framework 200. In addition, the system 100 is configured to perform zero-shot testing on the machine learning system 210 via the neuro-symbolic framework 200. After undergoing pre-training (or both pre-training and zero-shot testing), the system 100 is configured to employ the machine learning system 210 for use. Alternatively, the system 100 is configured to enable the pre-trained (or pre-trained and zero-shot tested) machine learning system 210 to be employed and/or deployed in another system (e.g. system 500 of FIG. 5) for use.

The system 100 includes at least a processing system 140. The processing system 140 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 140 is operable to provide the functionality of the neuro-symbolic framework 200 and the machine learning system 210, as described herein.

The system 100 includes at least a memory system 120, which is operatively connected to the processing system 140. In an example embodiment, the memory system 120 includes at least one non-transitory computer readable medium, which is configured to store and provide access to various data to enable at least the processing system 140 to perform the operations and functionalities with respect to the neuro-symbolic framework 200 and corresponding machine learning system 210, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 140 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 140 and/or other components of the system 100.

The memory system 120 includes at least the neuro-symbolic framework 200, the machine learning system 210, machine learning data 220, and other relevant data 230, which are stored thereon and accessible therefrom. The neuro-symbolic framework 200 includes computer readable data that, when executed by the processing system 140, is configured to generate at least one training set with a suitable number of query tasks for the machine learning system 210. In addition, the neuro-symbolic framework 200 includes computer readable data that, when executed by the processing system 140, is configured to implement a zero-shot testing process (or a zero-shot evaluation process) to evaluate the pre-trained (or trained) machine learning system 210 with respect to various commonsense tasks. The computer readable data can include instructions, code, routines, various related data, any software technology, or any number and combination thereof.

In an example embodiment, the machine learning system 210 includes at least one machine learning model. More specifically, the machine learning system 210 includes at least one language model. For example, the machine learning system 210 includes an auto-regressive language model, a masked language model (MLM), any suitable neural language model, or any number and combination thereof.

In an example embodiment, the machine learning data 220 includes various data, which the neuro-symbolic framework 200 uses to train, test, and develop the machine teaming system 210. For example, the machine learning data 220 includes a global knowledge graph 220A. The global knowledge graph 220A is generated by combining various knowledge graphs 220B. The machine learning data 220 may also include one or more knowledge bases, which are associated with one or more of the knowledge graphs 220B. The machine learning data 220 also includes a set of commonsense task datasets 220C, which cover a diverse set of tasks. In addition, the machine learning data 220 may also include various annotations, various loss data, various parameter data, as well as any related data that enables the neuro-symbolic framework 200 and the machine learning system 210 to perform the functions as described herein while meeting certain performance criteria. Meanwhile, the other relevant data 230 provides various data (e.g. operating system, etc.), which enables the system 100 to perform the functions as discussed herein.

In an example embodiment, as shown in FIG. 1, the system 100 is configured to include at least one human machine interface (HMI) system 110. The HMI system 110 includes at least one user interface, at least one HMI device, or any number of combination thereof. For example, the HMI system 110 may include a visual user interface, an auditory user interface, a tactile user interface, any suitable user interface, or any number and combination thereof. The HMI system 110 is operable to communicate with the I/O system 130. The HMI system 110 is also operable to communicate with one or more other components (e.g., processing system 140, memory system 120, etc.) of the system 100. More specifically, for example, the processing system 140 is configured to obtain or extract a query or a query task directly or indirectly from the HMI system 110, the memory system 120, and/or the I/O system 130. Upon receiving the query or query task, the processing system 140 is configured to provide a predicted answer to the query or query task via the machine learning system 210.

In addition, the system 100 includes other components that contribute to the training and/or execution of the neuro-symbolic framework 200 and the machine learning system 210. For example, as shown in FIG. 1, the memory system 120 is also configured to store other relevant data 230, which relates to operation of the system 100 in relation to one or more components (e.g., sensor system 110, I/O system 130, and other functional modules 150). In addition, the I/O system 130 may include an I/O interface and may include one or more devices (e.g., microphone, keyboard device, touch display device, microphone, mouse, speaker device, etc.). Also, the system 100 includes other functional modules 150, such as any appropriate hardware technology, software technology, or combination thereof that assist with or contribute to the functioning of the system 100. For example, the other functional modules 150 include communication technology that enables components of the system 100 to communicate with each other as described herein. Accordingly, with at least the components shown in FIG. 1, the system 100 is configured to execute the neuro-symbolic framework 200 to pre-train (or train) the machine learning system 210 to perform well across various query tasks (e.g. question-answering tasks) in a zero-shot setting or when deployed/employed for use in an application.

Figure 2:
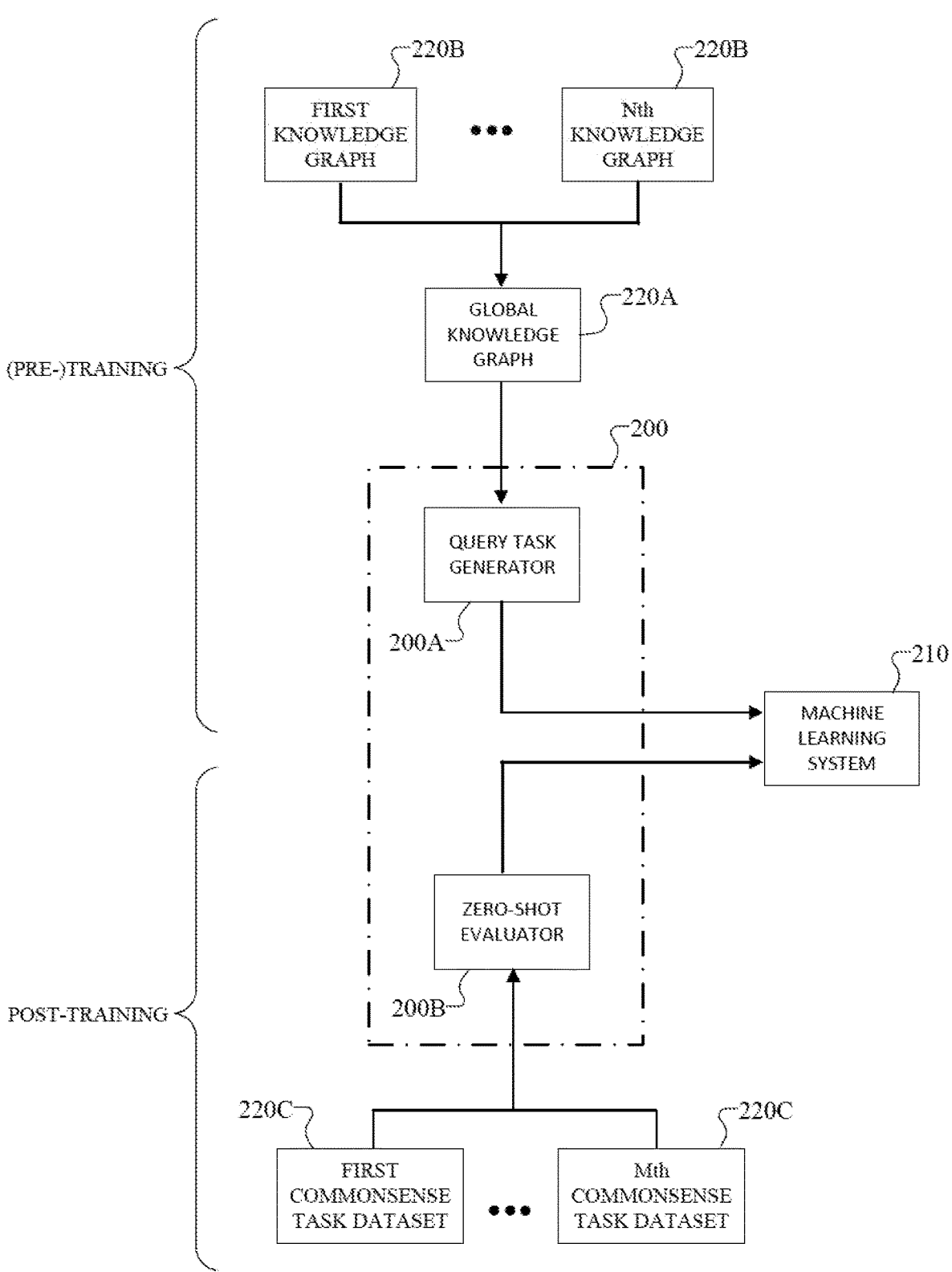
FIG. 2 is a conceptual diagram of an example of the neuro-symbolic framework for query tasks with respect to the machine learning system according to an example embodiment of this disclosure.

FIG. 2 is a conceptual diagram of the neuro-symbolic framework 200 with respect to the machine learning system 210. In an example embodiment, the neuro-symbolic framework 200 includes at least a query task generator 200A. The query task generator 200A is configured to obtain data structures (e.g., triples) from a global knowledge graph 220A. As shown in FIG. 2, the global knowledge graph 220A includes a number of distinct knowledge graphs 220B, where the total number of knowledge graphs 220B is represented by "N" in FIG. 2. In this regard, "N" represents an integer number that is at least greater than two. The query task generator 200A is configured to generate query tasks based on the data structures of the global knowledge graph 220A. The query task generator 200A is configured to create a training set that includes a suitable number of query tasks. The query task generator 200A is configured to pre-train or train the machine learning system 210 with at least one training set. The query task generator 200A is also configured to compute at least one score for the machine learning system 210 and fine-time the machine learning system 210, for example, based on the score data, the loss data, and/or any other relevant data. The query task generator 200A ensures that the machine learning system 210 is pre-trained or trained to perform well across various commonsense tasks when tested in a zero-shot setting and/or when deployed/employed for use in an application.

In addition, the neuro-symbolic framework 200 is configured to include a zero-shot evaluator 200B. The zero-shot evaluator 200B is configured to perform zero-shot testing on the machine learning system 210. As indicated in FIG. 2, the zero-shot evaluator 200B is configured to perform the zero-shot testing during a post-training phase. The post-training phase refers to any phase that occurs after the pre-training (or training) of the machine learning system 210 with at least one training set that is generated by the query task generator 200A. The zero-shot evaluator 200B is configured to test the machine learning system 210 with a commonsense task dataset 220C in a zero-shot manner. In this regard, the machine learning system 210 is configured to process each commonsense task dataset 220C without having observed that commonsense task dataset 220C beforehand. The zero-shot evaluator 200B is configured to obtain a set of commonsense task datasets 220C and apply each commonsense task dataset 220C to the machine learning system 210. The set of commonsense task datasets 220C includes a number of commonsense task datasets 220C, where the total number of commonsense task datasets 220C is represented by 'M' in FIG. 2. In this regard, "M" represents an integer number that is at least greater than two. Each commonsense task dataset is 220C distinct from the other commonsense task datasets 220C of the set, for example, with respect to the format of the query task and/or the knowledge type associated with the query task. With the various commonsense task datasets 220C, the zero-shot evaluator 200B is advantageously configured to demonstrate the effectiveness of the pre-training (or training) of the machine learning system 210 based on the training set that was generated by the query task generator 200A. In this regard, the zero-shot evaluator 200B is configured to provide a robust measure of the reasoning abilities of the machine learning system 210. The zero-shot evaluator 200B is also configured to evaluate the machine learning system 210 along with the impact of the pre-training across various commonsense task dataset 220C.

As aforementioned, the set of commonsense task datasets 220C includes various commonsense task datasets 220C. Each commonsense task dataset 220C is distinct from the training set, which is generated by the query task generator 200A. The set of commonsense task datasets 220C are datasets, which the machine learning system 210 has not observed at all during its pre-training phase or training phase. In this regard, the set of commonsense task datasets 220C are selected to cover a diverse set of tasks, for instance, with respect to at least format (e.g., question answering, pronoun resolution, natural language inference, etc.), knowledge type (e.g., social knowledge, physical knowledge, etc.), or both format and knowledge type. For example, there may be a task dataset 220C that includes a natural inference task, where a beginning and ending of a story are given and where the task is to choose the more plausible hypotheses out of a set of response options. In addition, there may be a task dataset 220C that includes a broad range of commonsense aspects, where the task is to respond to a question by selecting one of five response options. As another example, there may be a task dataset 220C that focuses on physical reasoning, where the task is to pick a more plausible response option out of two possible continuations. Also, there may be a task dataset 220C that focuses on reasoning based on social interactions, where the task includes some context, a question, and a set of response options. As yet another example, there may be a task dataset 220C that involves pronoun resolution, where the task includes some context, an emphasized pronoun, and response options that are offered as possible references. Furthermore, the set of commonsense task datasets 220C are not limited to the aforementioned commonsense task datasets 220C, but may include any task dataset 220C that is suitable for performing zero-shot testing on the machine learning system 210.

Figure 3B:
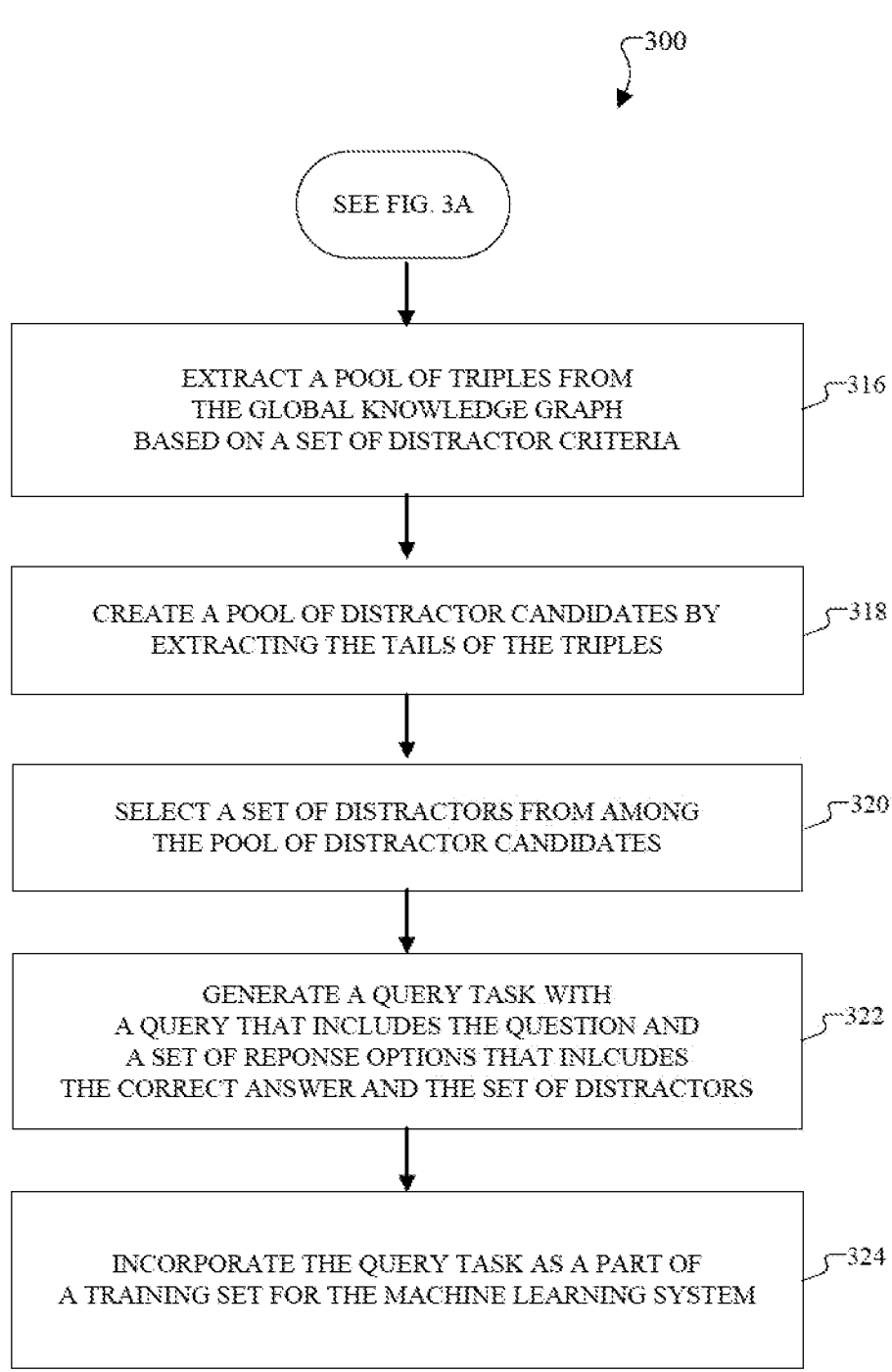
Figure 4:
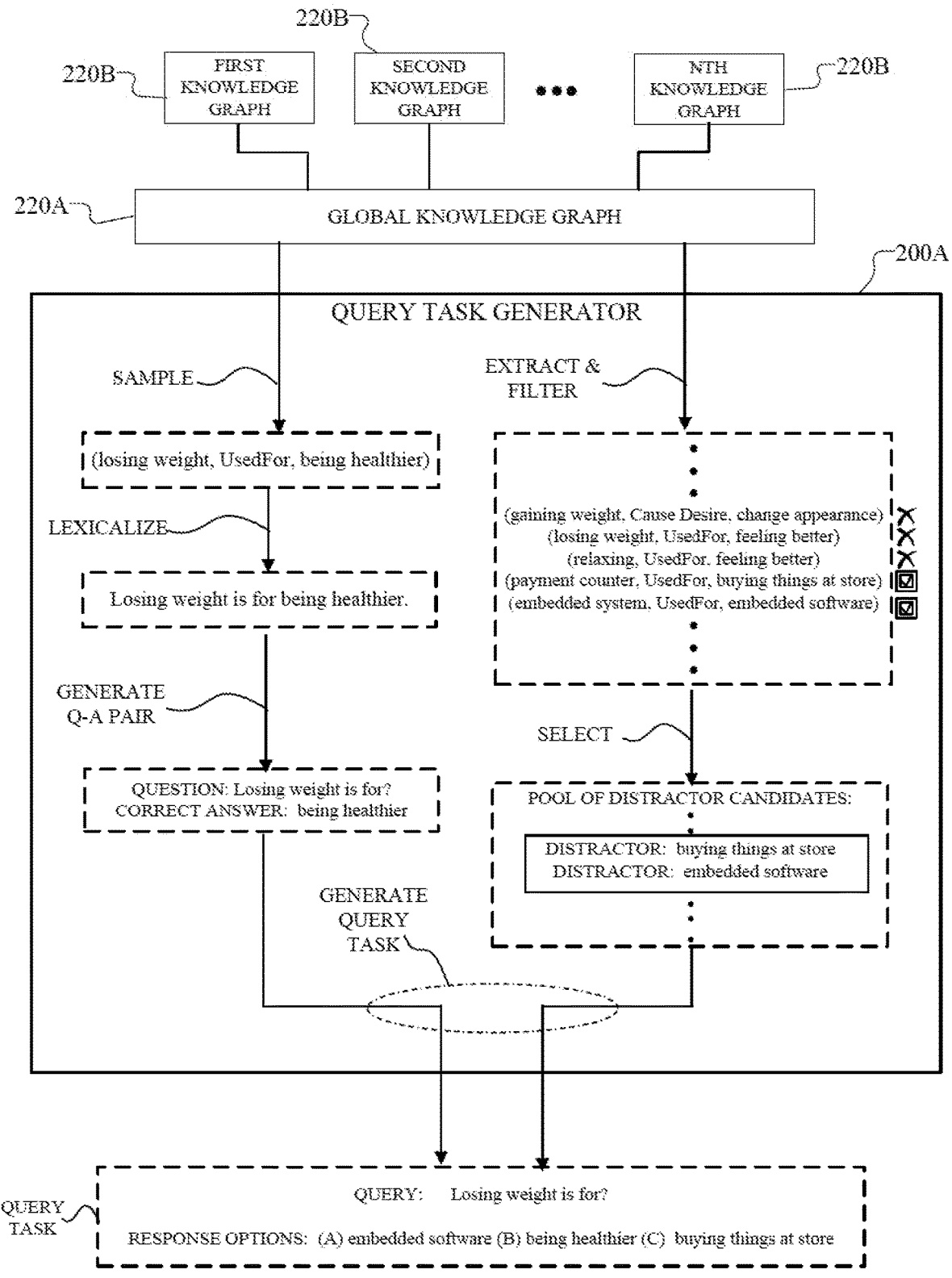
FIG. 4 is a flow diagram of an example of an implementation of the query task generator according to an example embodiment of this disclosure.

FIGS. 3A-3B and FIG. 4 illustrate a knowledge-driven and self-supervised process for automatically generating at least one query task according to an example embodiment. More specifically, FIGS. 3A-3B illustrate a flow chart for the method 300 and FIG. 4 illustrates a flow diagram of a non-limiting example of an implementation of the method 300. This process is performed by at least one processor of the processing system 140. In this regard, the processing system 140 is configured to execute and/or nm computer-readable data to perform the process. The computer readable data is stored in at least one non-transitory computer readable medium of the memory system 120. The computer readable data can include various instructions, data structures, applications, routines programs, modules, procedures, other software components, or any number and combination thereof.

At step 302, according to an example, the processing system 140 is configured to obtain a global knowledge graph 220A, which includes various knowledge graphs 220B. As shown in FIG. 4, the global knowledge graph 220A may be generated via the processing system 140 by combining various knowledge graphs 220B, where each knowledge graph 220B is distinct. Depending on the nature of the various knowledge graphs 220B, the global knowledge graph 220A may include at least one data partition. For example, the global knowledge graph 220A is configured to include a first data partition with at least one knowledge graph 220B, which expresses pre- and post-states for events and their participants with nine relations. This knowledge graph 220B may include head nodes, which are events, and tail nodes, which are either events or attributes. In addition, the global knowledge graph 220A is configured to include a second data partition with at least one or more other knowledge graphs 220B, which express commonsense facts between concepts. The query task generator 200A advantageously provides the machine learning system 210 with a global knowledge resource so that the machine learning system 210 is trained to provide consistent gains across different query tasks. Moreover, the combination of the various knowledge graphs 220B provides the machine learning system 210 with the benefit of more diverse knowledge compared to that of a single knowledge graph 220B. Pre-training (or training) the machine learning system 210 with this diverse knowledge enables the machine learning system 210 to perform well across various commonsense tasks in a zero-shot setting.

At step 304, according to an example, the processing system 140 is configured to obtain a data structure from the global knowledge graph 220A. In this example, the processing system 140 is configured to sample a data structure. The sampled data structure may correspond to any one of the knowledge graphs 220B that is a part of the global knowledge graph 220A. In this case, the data structure is a triple, which includes a head element, a relationship element, and a tail element, which may be denoted as (h, r, t), whereby 'h' represents the head element (or subject), 'r' represents the relationship element (or a relation), and 't' represents the tail element (or an object). Each element (e.g. head element) of the data structure may include any suitable amount of data. Referring to FIG. 4, as an example, the processing system 140 is configured to sample a triple (losing weight, UsedFor, being healthier) from the global knowledge graph 220A. In this case, the head element is "losing weight," the relationship element is "UsedFor," and the tail element is "being healthier." The relationship element indicates a relation between the head element and the tail element.

At step 306, according to an example, the processing system 140 is configured to determine if there is a sentence associated with the triple. If the processing system 140 determines that there is a sentence associated with the triple, then the process proceeds to step 310. Alternatively, if the processing system 140 determines that there is no sentence that is associated with the triple, then the process proceeds to step 308. For instance, referring to FIG. 4 as a non-limiting example, the processing system 140 is configured to determine that there is no sentence associated with the triple of (losing weight, UsedFor, being healthier) and then proceeds to generate a sentence for this triple at step 308.

At step 308, according to an example, the processing system 140 is configured to lexicalize the data structure obtained at step 304. In this regard, the processing system 140 is configured to generate a sentence based on the triple. More specifically, the processing system 140 is configured to construct a sentence by joining the head element and the tail element via a relation of the relationship element. Referring to FIG. 4, as an example, the processing system 140 is configured to lexicalize the data structure of (losing weight, UsedFor, being healthier) into the following sentence: Losing weight is for being healthier. Upon lexicalizing the data structure, the processing system 140 is configured to confirm the sentence at step 306 before proceeding to step 310, as shown, or proceed directly to step 310 without receiving further confirmation at step 306.

At step 310, according to an example, the processing system 140 is configured to generate a question-answer pair based on the sentence. The question-answer pair includes (i) "a question" and (ii) "a correct answer" to that question. The processing system 140 is configured to use the same sentence to construct both the question and the correct answer. More specifically, upon obtaining the sentence, the processing system 140 is configured to remove the tail element from the sentence and generate the question from the remaining part of the sentence. In addition, the processing system 140 is configured to denote that tail element as being the correct answer to the question.

Referring to FIG. 4, as a non-limiting example, the processing system 140 generates the question ("Losing weight is for?") from the sentence ("Losing weight is for being healthier.") by removing the tail element ("being healthier") from that sentence. In addition, the processing system 140 is configured to extract the tail element ("being healthier") from that sentence ("Losing weight is for being healthier."). The processing system 140 is configured to indicate that the extracted tail element ("being healthier") is the correct answer to the question ("Losing weight is for?"). In this case, the question-answer pair includes the question of "Losing weight is for?" and the correct answer of "being healthier."

At step 312, according to an example, the processing system 140 is configured to determine whether or not there are distinct tokens between the head element and the correct answer. In this regard, the processing system 140 uses tokens for keywords (or non-stop words). The processing system 140 is configured to determine if there is any token overlap (at least one common or shared keyword) between the head element and the correct answer. If the processing system 140 determines that there is at least one overlapping token between these two components, then the process proceeds to step 314. Alternatively, if the processing system 140 determines that is no overlapping token between these two components, then the process proceeds to perform step 316. For instance, in FIG. 4, the processing system 140 determines that there is no overlapping token (or the same keyword) between the head element ("losing weight") and the correct answer ("being healthier"), and thus proceeds to perform step 316.

At step 314, according to an example, the processing system 140 is configured to filter out the question-answer pair upon determining that there is at least one overlapping token between the head element and the correct answer. By doing so, the processing system 140 is configured to ensure that the correct answer is not the same as or substantially similar to the question itself. In this regard, the processing system 140 determines that the question-answer pair is not suitable to generate a query task, which is to be used in the training set for pre-training the machine learning system 210. Upon making such a determination, the processing system 140 proceeds to step 304 if more query tasks are requested to provide a suitable number of query tasks for the training set or the processing system 140 stops the process of generating query tasks if there are already a suitable number of query tasks for the training set.

At step 316, according to an example, the processing system 140 is configured to extract a pool of data structures from the global knowledge graph 220A based on a set of distractor criteria. The pool of data structures may therefore comprise diverse members, such as data structures of one knowledge graph 220B, data structures of another knowledge graph 220B, and so forth as long as each one meets the set of distractor criteria. In this example, the data structures are triples. Each triple includes a head element, a relationship element, and a tail element, as expressed by (h', r', t'), where "h'" represents the head element (or a subject), "r'" represents the relationship element (or a relation), and "t'" represents the tail element (or an object). In this case, each element of the triple includes an apostrophe mark to further indicate that the triple is a "negative" sample, which is extracted from the global knowledge graph 220A to generate a distractor. These data structures are extracted from the global knowledge graph 220A based on a set of distractor criteria. In general, the set of distractor criteria ensures that the triple includes distractor data, which is considered informative and fair. For example, with respect to being informative, the set of distractor criteria ensures that the triple includes distractor data, which exhibits semantic relatedness with a context of the correct answer. Also, with respect to being fair, the set of distractor criteria ensures that the triple includes distractor data, which is relatively easy to discriminate from the correct answer.

In an example embodiment, the set of distractor criteria includes at least a filter that extracts triples such that each triple possesses a relationship element (r'), which is the same as the relationship element (r) of the sampled triple that forms the basis of the question-answer pair. This criteria is advantageous in ensuring that the distractor data can fill the same semantic role as the correct answer. In addition, the set of distractor criteria includes a filter that extracts triples such that there is no keyword overlap (or non-stop word overlap) between the head element (h') of the extracted triple and the head element (h) of the sampled triple that forms the basis of the question-answer pair. Also, the set of distractor criteria includes a filter that extracts triples such that each extracted triple has a tail element (t') that is not a member of a knowledge set that includes the head element (h) and the relationship element (r) of the sampled triple that forms the basis of the question-answer pair. In other words, the extracted triple (h', r', t') cannot be equal to (h, r, t'). This ensures that the extracted triple is not part of the correct answer set or part of the same knowledge set. The processing system 140 is configured to implement at least these three criteria to provide a pool of triples, which is used to form the pool of distractor candidates at step 318. As discussed above, this set of distractor criteria enables the processing system 140 to generate query tasks with distractors, which are informative and fair and which enable the machine learning system 210 to be trained to perform well in zero-shot tests across various commonsense task datasets. The processing system 140 is configured to use this set of distractor criteria as a basis for obtaining the pool of distractor candidates, but is not limited to these three distractor criteria and may also configured to implement other suitable criteria.

Referring to FIG. 4, as a non-limiting example, the processing system 140 extracts triples from the global knowledge graph 220A based on the set of distractor criteria. FIG. 4 illustrates the extraction process, such as the filtering out of triples that don't satisfy the set of distractor criteria and the procuring of triples that satisfy the set of distractor criteria. More specifically, with regard to the first triple (gaining weight, Cause Desire, change appearance), the processing system 140 is configured to filter out this first triple since the relationship element (r'=CauseDesire) of this first triple is not the same as the relationship element (r=UsedFor) of the sampled triple that forms the basis of the question-answer pair. The first triple therefore does not become a part of the pool of triples, which will be used in creating the pool of distractor candidates. With regard to the second triple (losing weight, UsedFor, feeling better), the processing system 140 determines that r'=r=UsedFor, thereby satisfying one criteria from the set of distractor criteria. However, the processing system 140 filters out this second triple since the head element (h'=losing weight) of the second triple and the head element (h=losing weight) of the sampled triple have overlapping keywords of "losing weight." Additionally or alternatively, the processing system 140 filters out this second triple since the second triple is a member of a knowledge set that includes the head element (h) and the relationship element (r) of the sampled triple that forms the basis of the question-answer pair. In this regard, the processing system 140 filters out the second triple upon determining that this second triple (h', r', t') has a tail element (t'=feeling better), which is part of a correct answer set for the sampled triple such that (h, r, t'). Also, with regard to the third triple (relaxing, UsedFor, feeling better), the processing system 140 is configured to filter out this third triple since the third triple is a member of the knowledge set that includes the head element (h) and the relationship element (r) of the sampled triple that forms the basis of the question-answer pair. In this regard, the processing system 140 filters out the third triple upon determining that this third triple (h', r', t') has a tail element (t'=feeling better), which is part of a correct answer set for the sampled triple such that (h, r, t').

Furthermore, in the non-limiting example of FIG. 4, the processing system 140 is configured to determine that the fourth triple (payment counter, UsedFor, buying things at store) satisfies the set of distractor criteria. The processing system 140 therefore includes the fourth triple (payment counter, UsedFor, buying things at store) as a part of the pool of triples, which are extracted from the global knowledge graph 220A and which satisfy the set of distractor criteria. Also, the processing system 140 is configured to determine that the fifth triple (embedded system, UsedFor, embedded software) satisfies the set of distractor criteria. The processing system 140 therefore includes the fifth triple (embedded system, UsedFor, embedded software) as a part of the pool of triples, which are extracted from the global knowledge graph 220A and which satisfy the set of distractor criteria. Upon extracting triples from the global knowledge graph 220A that satisfy the set of distractor criteria, the processing system 140 proceeds to perform step 318.

At step 318, according to an example, the processing system 140 is configured to create a pool of distractor candidates. The pool of distractor candidates may be represented as $D=(D_1, D_2, \ldots, D_n)$, where 'D' represents the pool (or the set), '$D_i$' represents a respective distractor candidate of the pool, and 'n' represents the total number of distractor candidates. More specifically, the processing system 140 is configured extract the tail elements from the pool of data structures, which were obtained at step 316. The pool of distractor candidates includes the extracted tails.

Referring to FIG. 4, as a non-limiting example, the processing system 140 extracts the tail element (buying things at the store) from the fourth triple (payment counter, UsedFor, buying things at the store). The processing system 140 includes the extracted tail element (buying things at the store) of the fourth triple as a distractor candidate within the pool of distractor candidates. In addition, the processing system 140 extracts the tail element (embedded software) from the fifth triple (embedded system, UsedFor, embedded software). The processing system 140 includes the extracted tail element (embedded software) of the fifth triple as a distractor candidate within the pool of distractor candidates. Accordingly, in this non-limiting example, the pool of distractor candidates includes a sufficient number of distractor candidates, such as the distractor candidate of "buying things at the store" and the distractor candidate of "embedded software." Upon generating the pool of distractor candidates, the processing system 140 proceeds to perform step 320.

At step 320, according to an example, the processing system 140 is configured to select a set of distractors from among the pool of distractor candidates. There a number of different selection processes that the processing system 140 can use to select a predetermined number of distractor candidates to serve as distractors for the set of distractors. For instance, the processing system 140 is configured to perform a random selection process to select a set of distractors from the pool of distractor candidates. As a non-limiting example, in FIG. 4, the processing system 140 randomly selects the distractor candidate of "buying things at the store" from among the pool of distractor candidates. In addition, the processing system 140 randomly selects the distractor candidate of "embedded software" from among the pool of distractor candidates. In this case, the set of distractors is configured to include two distractor elements. Upon obtaining a complete set of distractors, the processing system 140 proceeds to perform step 322.

Alternatively to the random selection process, the processing system 140 is configured to employ another type of selection process to select a distractor candidate to serve as a distractor for the set of distractors. For example, the processing system 140 is configured to employ an "adversarial-answer" selection process. Upon employing the adversarial-answer selection process, the processing system 140 is configured to select distractor candidates that are as similar as possible to the correct answer while being under a certain threshold. As another example, the processing system 140 is configured to employ an "adversarial-question" selection process. Upon employing the adversarial-question selection process, the processing system 140 is configured to select distractor candidates that are as similar as possible to the question while being under a certain threshold.

For each of the adversarial type of selection processes, the processing system 140 is configured to compute embeddings for all applicable knowledge graph nodes. In this regard, the processing system 140, via the query task generator 200A, is configured to define a similarity of two nodes to be their proximity in the embedding space, as measured by cosine similarity. For instance, with respect to the adversarial-answer selection process, the processing system 140 is configured select distractor candidates that have a greatest cosine similarity score with respect to the correct answer while satisfying at least one threshold that ensures that the distractor candidates are not too similar to the correct answer. Also, with respect to the adversarial-question selection process, the processing system 140 is configured select distractor candidates that have a greatest cosine similarity score with respect to the question while satisfying at least one threshold that ensures that the distractor candidates are not too similar to the question. More specifically, for each of the adversarial type of selection processes, the processing system 140 is configured to set an upper bound on the cosine similarity score to avoid unfair distractor candidates (e.g., a distractor candidate that paraphrases the correct answer and/or a distractor candidate that paraphrases the question). Accordingly, by generating more challenging distractors for the query tasks, the processing system 140 is configured to pre-train or train the machine learning system 210 to achieve better generalization across tasks.

At step 322, according to an example, the processing system 140 is configured to generate a query task. In this example, the query task includes a query along with response options. In this case, the query includes the question. Meanwhile, the response options include the correct answer and the set of response options. The response options may be presented in any order. For example, the correct answer may be presented as the first response option, the last response option, or an intermediate response option. The processing system 140 may perform a random process or a strategic process to select the order in which the response options are presented for the query task.

Referring to FIG. 4, as a non-limiting example, the processing system 140 is configured to generate a query task, which includes a query and a set of response options. In this case, the query is the question: "Losing weight is for?". Meanwhile, the set of response options include "embedded software," "being healthier," and "buying things at the store." In this case, the set of response options include a distractor, the correct answer, and another distractor. More specifically, in FIG. 4, the processing system 140 may present the following query task:

QUERY: Losing weight is for

RESPONSE OPTIONS: (A) embedded software (B) being healthier (C) buying things at the store Furthermore, the processing system 140 is not limited to generating this type of query task. For example, the query task may differ based on the data structure obtained from the global knowledge graph 220A. As another non-limiting example, the processing system 140 is configured to generate another query task in which (i) the query also includes some contextual data with the question and (ii) the response options include the correct answer and the distractors. For instance, the processing system 140 may present the following query task in which the contextual data is "Robin takes the fifth." the question is "As a result, Robin wanted to," the first distractor is "go to the cinema," the second distractor is "hear what they think," and the correct answer is "withhold information."

QUERY: Robin takes the fifth. As a result, Robin wanted to

RESPONSE OPTIONS: (A) go to the cinema (B) hear what they think (C) withhold information At step 324, according to an example, the processing system 140 is configured to (i) create a training set that includes at least the query task or (ii) incorporate the query task as a part of an existing training set. In this regard, the processing system 140 is configured to provide a training set of relatively challenging query tasks, which are informative and fair. Once the training set includes a suitable number of query tasks, the processing system 140 is configured to pre-train or train the machine learning system 210 with the training set.

In addition, if the random selection process was selected at step 320, then the processing system 140 is further configured to employ an adversarial filter to detect and keep the query tasks, which are determined to be sufficiently challenging at pre-training (or training) time, and filter out the non-challenging query tasks. With the random selection process, the processing system 140 may generate some non-challenging query tasks, which may be too easy for the machine learning system 210. Accordingly with the adversarial filter, the processing system 140 is configured to keep only those query tasks which comprise a challenging subset to train the machine learning system 210. As an example, the processing system 140 is configured to iteratively filter out easy examples using an ensemble of linear classifiers.

Figure 5:
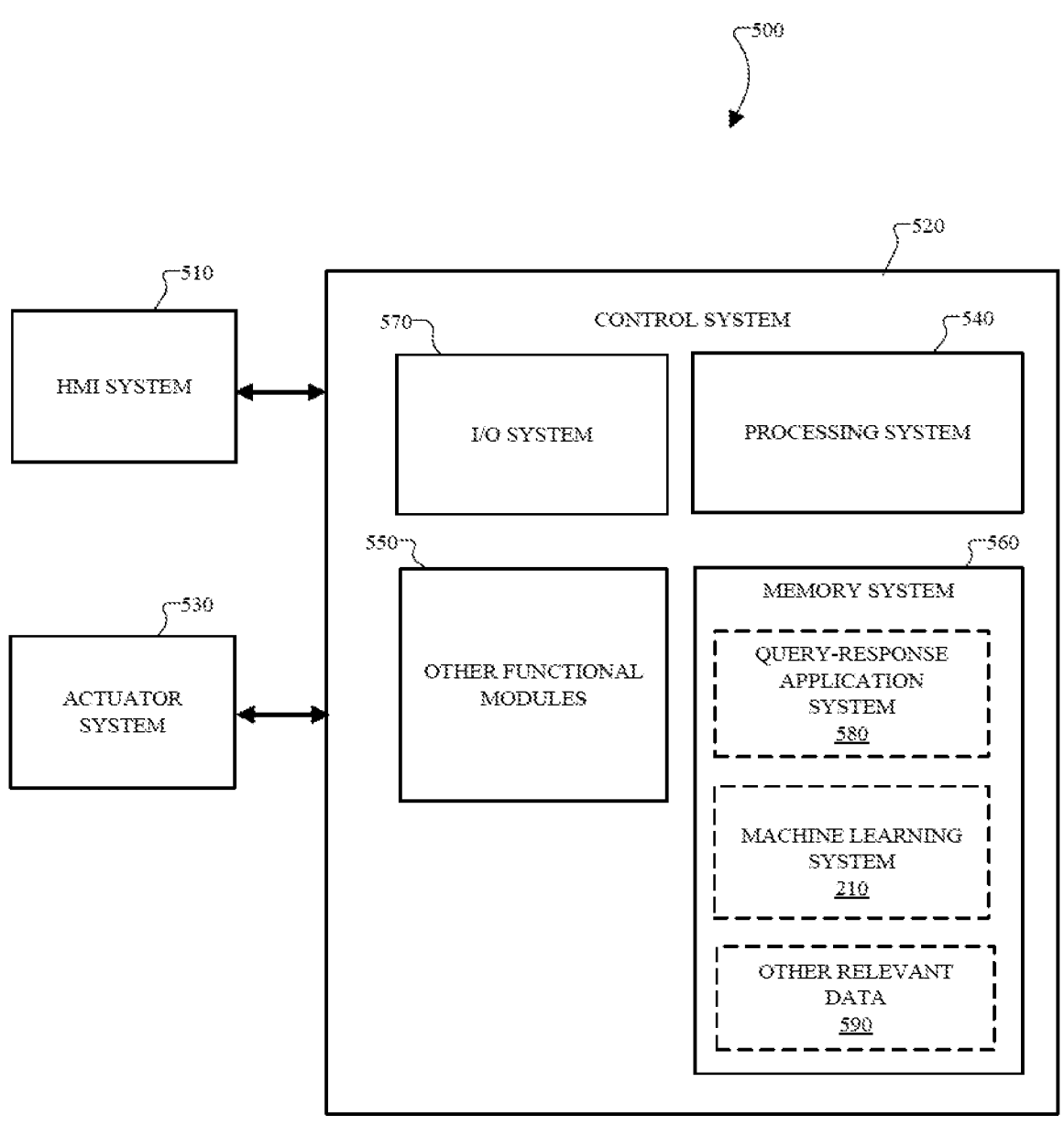
FIG. 5 is a diagram of an example of a control system that employs the trained machine learning system of FIG. 1 according to an example embodiment of this disclosure.

FIG. 5 is a diagram of a system 500, which is configured to include at least the pre-trained (or trained) machine learning system 210. In this regard, the system 500 includes at least an HMI system 510, a control system 520, and an actuator system 530. The system 500 is configured such that the control system 520 controls the actuator system 530 based on the input received from the HMI system 510. More specifically, the HMI system 510 includes one or more user interfaces and/or devices that communicate with one or more I/O devices of the I/O system 570. Upon obtaining input, the HMI system 510 is operable to communicate with the control system 520 via the input/output (I/O) system 570 and/or other functional modules 550, which includes communication technology.

The control system 520 is configured to obtain input from the HMI system 510. Upon receiving input, the control system 520 is operable to process the input via a processing system 540. In this regard, the processing system 540 includes at least one processor. For example, the processing system 540 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least the input received from the HI system 510, the processing system 540 is operable to provide the machine learning system 210 with a query or query task based on the input. The processing system 540 is also configured to generate a predicted answer via the machine learning system 210. The processing system 540 is configured to generate output data based on the predicted answer. The processing system 540 is configured to provide the output data and/or the predicted answer to the user via the I/O system 570 and/or the HMI system 510. In addition, the processing system 540 is operable to generate actuator control data based on the output data and/or the predicted answer. The control system 520 is configured to control the actuator system 530 according to the actuator control data.

The memory system 560 is a computer or electronic storage system, which is configured to store and provide access to various data to enable at least the operations and functionality, as disclosed herein. The memory system 560 comprises a single device or a plurality of devices. The memory system 560 includes electrical, electronic, magnetic, optical, semiconductor, electromagnetic, any suitable memory technology, or any combination thereof. For instance, the memory system 560 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 520 and/or processing system 540, the memory system 560 is local, remote, or a combination thereof (e.g., partly local and partly remote). For example, the memory system 560 is configurable to include at least a cloud-based storage system (e.g. cloud-based database system), which is remote from the processing system 540 and/or other components of the control system 520.

The memory system 560 includes the machine learning system 210, which has been pre-trained (or trained) via the neuro-symbolic framework 200 (FIGS. 1-2). This pre-trained or trained machine learning system 210 is configured to be implemented, executed, and/or employed via the processing system 540. In this regard, the machine learning system 210 is configured to receive and process a query or query task as input data. The machine learning system 210 is configured to provide a predicted answer in response to the query or query task. In this regard, the machine learning system 210 is configured to perform question-answering.

In addition, the memory system 560 includes a query-response application system 580. The query-response application system 580 is configured to ensure that the machine learning system 210 is provided with a query or a query task as input data. In this regard, the processing system 540, via the query-response application system 580, is configured to process the input from the HMI system 510. If deemed necessary, the query-response application system 580 is configured to generate a query or query task upon processing the input from the HMI system 510. In addition, in some instances, the query-response application system 580 is configured to generate output data based on the predicted answer obtained from the machine learning system 210. In general, the query-response application system 580 enables the machine learning system 210 to operate seamlessly as a part of the control system 520 for the desired application.

Furthermore, as shown in FIG. 5, the system 500 includes other components that contribute to operation of the control system 520 in relation to the HMI system 510 and the actuator system 530. For example, as shown in FIG. 5, the memory system 560 is also configured to store other relevant data 590, which relates to the operation of the system 500. Also, as shown in FIG. 5, the control system 520 includes the I/O system 570, which includes one or more I/O devices that relate to the system 100. Also, the control system 520 is configured to provide other functional modules 550, such as any appropriate hardware technology, software technology, or any combination thereof that assist with and/or contribute to the functioning of the system 500. For example, the other functional modules 550 include an operating system and communication technology that enables components of the system 500 to communicate with each other as described herein. Also, the components of the system 500 are not limited to this configuration, but may include any suitable configuration as long as the system 500 performs the functionalities as described herein. For example, the HMI system 510 may be a more integral part of the I/O system 570 and/or the control system 520. Accordingly, the system 500 is useful in various applications.

For example, as a non-limiting example, the system 500 may be a dialogue system, which is used to provide customer service and/or troubleshooting assistance. In this case, the system 500 does not further include the actuator system 530. In this regard, for instance, the HMI system 510 may include a user interface, which operates with the I/O system 570, such as a touchscreen device, to receive input from a user. Upon entering input data into the touchscreen device, the processing system 540 is configured to provide a query or query task to the pre-trained or trained machine learning system 210. In response to the query or query task, the processing system 540 is configured to provide a predicted answer via the machine learning system 210. The processing system 540 is configured to provide the predicted answer directly or indirectly as output data, which is received by the user via the touchscreen device.

Figure 6:
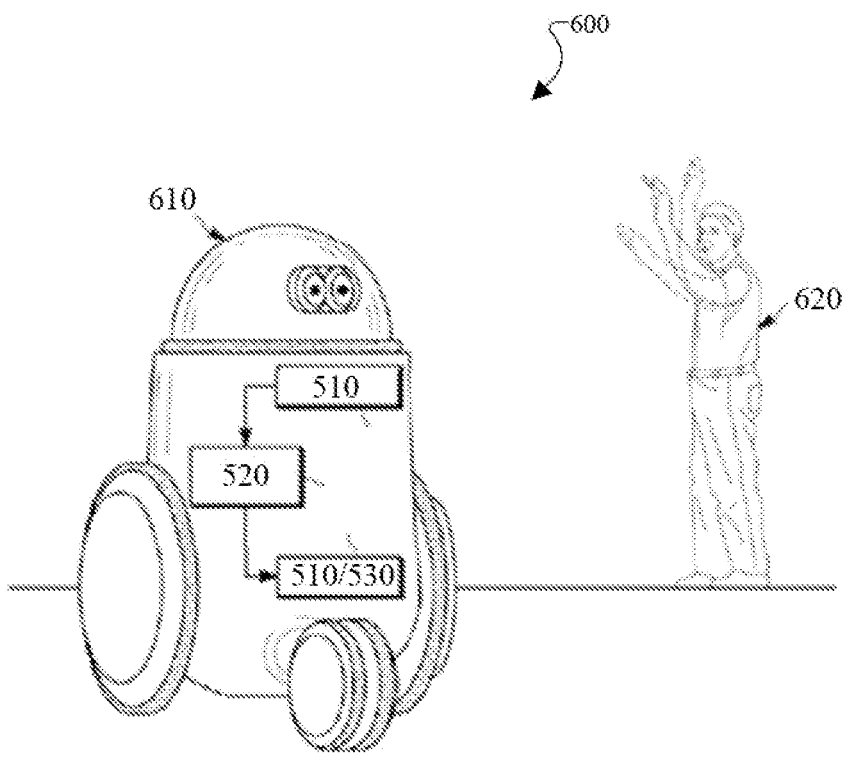
FIG. 6 is a diagram of an example of the control system of FIG. 5 with respect to robot and/or automated personal assistant technology according to an example embodiment of this disclosure.

FIG. 6 is a diagram of an example of an application of the system 500 with respect to automated personal assistant technology 600 according to an example embodiment. For instance, as one non-limiting example, the automated personal assistant technology 600 is a robot 610, which is configured to receive input that may directly or indirectly contain a query or query task. The automated personal assistant technology 600 is configured to process the input and provide a query or query task to the machine learning system 210. In response to the query or query task, the automated personal assistant technology 600 is configured to provide a predicted answer via the pre-trained or trained machine learning system 210. In addition, the automated personal assistant technology 600 is configured to control an appliance, such as a washing machine, a stove, a vacuum cleaner, an oven, a microwave, a dishwasher, another type of domestic appliance, any suitable apparatus, or any number and combination thereof. The HMI system 510 includes at least one user interface that operates together with the I/O system 570 (e.g., a microphone, a touchscreen, a keyboard, display technology, gesturing technology, a camera, a sensor, or any suitable technology) to obtain input.

The control system 520 is configured to obtain the input (e.g., audio commands, touchscreen commands, etc.) from the user 620 via the HMI system 510 and/or the I/O system 570. The control system 520 is configured to process the input. The control system 520 is configured provide a query or query task based on the input. In addition, the control system 520 is configured provide a predicted answer in response to the query or query task via the pre-trained or trained machine learning system 210. The control system 520 is configured to generate output data based on the predicted answer. The control system 520 is configured to provide the predicted answer and/or the output data to the I/O system 570 and/or the HMI system 510. The control system 520 is configured to generate actuator control data based on the predicted answer and/or the output data. Also, as a non-limiting example, in response to the actuator control data, the control system 520 is configured to control the actuator system 530.

Figure 7:
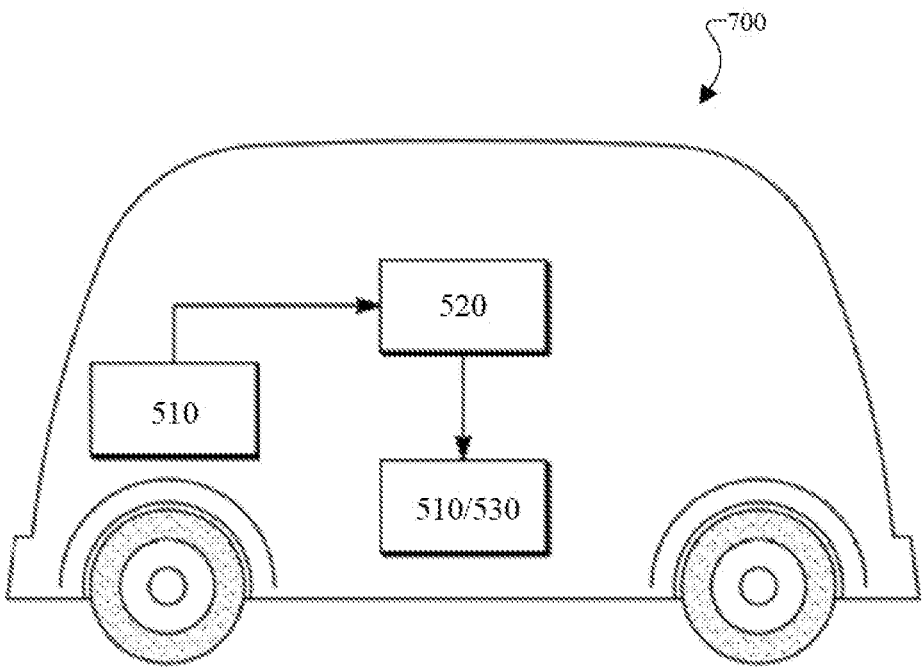
FIG. 7 is a diagram of an example of the control system of FIG. 5 with respect to mobile machine technology according to an example embodiment of this disclosure.

FIG. 7 is a diagram of an example of an application of the system 500 with respect to mobile machine technology according to an example embodiment. As a non-limiting example, the mobile machine technology includes at a vehicle 700, which is at least partially autonomous or fully autonomous. In FIG. 7, the vehicle 700 includes an HMI system 510, which is configured to receive input. Based on the input, the control system 520 is configured to provide at least a query or query task to the machine learning system 210. The machine learning system 210 is configured to provide a predicted answer in response to a query or query task. The control system 520 is configured to generate actuator control data, which is at least based on predicted answer. For instance, as a non-limiting example, the actuator system 530 is configured to actuate at least the braking system to stop the vehicle 700 upon receiving the actuator control data. In this regard, the actuator system 530 is configured to include a braking system, a propulsion system, an engine, a drivetrain, a steering system, or any number and combination of actuators of the vehicle 700. The actuator system 530 is configured to control the vehicle 700 so that the vehicle 700 follows rules of the roads and avoids collisions based at least on the predicted answer provided by the pre-trained (or trained) machine learning system 210.

As described herein, the embodiments provide a number of advantages and benefits. For example, the embodiments are knowledge-driven and self-supervised. The embodiments are configured to generate query tasks, which are based on a global knowledge graph 220A. The global knowledge graph 220A is advantageous in combining various knowledge graphs based on various knowledge bases. In these embodiments, the processing system 140 is enabled to generate a query task that is based on various knowledge graphs. The query task may therefore contain data from one or more distinct knowledge graphs 220B, which are a part of the global knowledge graph 220A. For example, the query task may include a question and a correct answer, which are derived from one knowledge graph while some of the distractors are derived from one or more other knowledge graphs. In addition, the embodiments are able to demonstrate that a global resource (e.g., global knowledge graph 220A) is able to bring consistent gains across various commonsense task datasets 220C even in a zero-shot setting. The embodiments therefore draw upon diverse knowledge via the various knowledge graphs to improve the quality of the training set. The embodiments provide knowledge alignment, which achieves better performance. The embodiments are configured to provide query tasks, which are relatively challenging for the machine learning systems 210 to solve while also being relatively easy for humans to solve. In addition, the embodiments are advantageous in providing non-trivial query tasks by selectively generating distractors based on the set of distractor criteria. Moreover, the embodiments automatically generate a training set with query tasks, which are considered informative and fair. The embodiments are configured to implement at least one adversarial strategy in developing the query tasks. Overall, the embodiments are configured to automatically generate query tasks for pre-training or training the machine learning systems in a manner that is effective in overcoming the technical problem relating to overfitting.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system, the computer-implemented method comprising:

obtaining a current data structure from a global knowledge graph that includes a combination of various knowledge graphs, the current data structure being associated with one knowledge graph of the global knowledge graph and including a current head element, a current relationship element, and a current tail element;

obtaining a sentence corresponding to the current data structure;

generating a question by removing the current tail element from the sentence;

generating a correct answer to the question, the correct answer including the current tail element;

extracting a pool of data structures from the global knowledge graph based on a set of distractor criteria, each extracted data structure having a head element with no common keywords with the current head element and a relationship element that is the current relationship element, the pool of data structures including at least one extracted data structure that is associated with another knowledge graph of the global knowledge graph;

extracting tail elements from the pool of data structures to create a pool of distractor candidates;

selecting a set of distractors from the pool of distractor candidates;

creating a query task that includes the question and a set of response options, the set of response options including the correct answer and the set of distractors;

creating a training set that includes at least the query task; and training the machine learning system with the training set, wherein the machine learning system is configured to receive the query task and respond to the question with a predicted answer that is selected from among the set of response options.

2. The computer-implemented method of claim 1, wherein each extracted data structure has a tail element that is not found in another data structure of the global knowledge graph in which the another data structure includes the current head element and the current relationship element.

3. The computer-implemented method of claim 1, wherein the step of selecting the set of distractors from the pool of distractor candidates comprises:

choosing distractor candidates via a random selection process; and creating the set of distractors to include a subset of the chosen distractor candidates.

4. The computer-implemented method of claim 1, wherein the step of selecting the set of distractors from the pool of distractor candidates comprises:

choosing distractor candidates that have a greatest cosine similarity score with respect to the correct answer while satisfying at least one threshold; and creating the set of distractors to include a subset of the chosen distractor candidates.

5. The computer-implemented method of claim 1, wherein the step of selecting the set of distractors from the pool of distractor candidates comprises:

choosing distractor candidates that have a greatest cosine similarity score with respect to the question while satisfying at least one threshold; and creating the set of distractors to include a subset of the chosen distractor candidates.

6. The computer-implemented method of claim 1, further comprising:

obtaining a task dataset having other tasks that are distinct from the query task; and performing a zero-shot evaluation of the machine learning system based on the task dataset, wherein the machine learning system is trained with the training set during a pre-training phase of the machine learning system.

7. A data processing system comprising:

at least one non-transitory computer readable medium including at least a neuro-symbolic framework, the neuro-symbolic framework including computer readable data;

a processing system including at least one processor that is operably connected to the at least one non-transitory computer readable medium, the processor being configured to execute the computer readable data to implement a method that includes:

obtaining a current data structure from a global knowledge graph that includes a combination of various knowledge graphs, the current data structure being associated with one knowledge graph of the global knowledge graph and including a current head element, a current relationship element, and a current tail element;

obtaining a sentence corresponding to the current data structure;

generating a question by removing the current tail element from the sentence;

generating a correct answer to the question, the correct answer including the current tail element;

extracting a pool of data structures from the global knowledge graph based on a set of distractor criteria, each extracted data structure having a head element with no common keywords with the current head element and a relationship element that is the current relationship element, the pool of data structures including at least one extracted data structure that is associated with another knowledge graph of the global knowledge graph;

extracting tail elements from the pool of data structures to create a pool of distractor candidates;

selecting a set of distractors from the pool of distractor candidates;

creating a query task that includes the question and a set of response options, the set of response options including the correct answer and the set of distractors;

creating a training set that includes at least the query task; and training a machine learning system with the training set, wherein the machine learning system is configured to receive the query task and respond to the question with a predicted answer that is selected from among the set of response options.

8. The data processing system of claim 7, wherein each extracted data structure has a tail element that is not found in another data structure of the global knowledge graph in which the another data structure includes the current head element and the current relationship element.

9. The data processing system of claim 7, wherein the step of selecting the set of distractors from the pool of distractor candidates comprises:

choosing distractor candidates via a random selection process; and creating the set of distractors to include a subset of the chosen distractor candidates.

10. The data processing system of claim 7, wherein the step of selecting the set of distractors from the pool of distractor candidates comprises:

choosing distractor candidates that have a greatest cosine similarity score with respect to the correct answer while satisfying at least one threshold; and creating the set of distractors to include a subset of the chosen distractor candidates.

11. The data processing system of claim 7, wherein the step of selecting the set of distractors from the pool of distractor candidates comprises:

choosing distractor candidates that have a greatest cosine similarity score with respect to the question while satisfying at least one threshold; and creating the set of distractors to include a subset of the chosen distractor candidates.

12. The data processing system of claim 7, wherein the method that further comprises:

obtaining a task dataset having other tasks that are distinct from the query task; and performing a zero-shot evaluation of the machine learning system based on the task dataset, wherein the machine learning system is trained with the training set during a pre-training phase of the machine learning system.

13. A computer product comprising at least one non-transitory computer readable storage device that includes computer-readable data, which when executed by one or more processors, is operable to cause the one or more processors to implement a method that comprises:

obtaining a current data structure from a global knowledge graph that includes a combination of various knowledge graphs, the current data structure being associated with one knowledge graph of the global knowledge graph and including a current head element, a current relationship element, and a current tail element;

obtaining a sentence corresponding to the current data structure;

generating a question by removing the current tail element from the sentence;

generating a correct answer to the question, the correct answer including the current tail element;

extracting a pool of data structures from the global knowledge graph based on a set of distractor criteria, each extracted data structure having a head element with no common keywords with the current head element and a relationship element that is the current relationship element, the pool of data structures including at least one extracted data structure that is associated with another knowledge graph of the global knowledge graph;

extracting tail elements from the pool of data structures to create a pool of distractor candidates;

selecting a set of distractors from the pool of distractor candidates;

creating a query task that includes the question and a set of response options, the set of response options including the correct answer and the set of distractors;

creating a training set that includes at least the query task; and training a machine learning system with the training set, wherein the machine learning system is configured to receive the query task and respond to the question with a predicted answer that is selected from among the set of response options.

14. The computer product of claim 13, wherein each extracted data structure has a tail element that is not found in another data structure of the global knowledge graph in which the another data structure includes the current head element and the current relationship element.

15. The computer product of claim 13, wherein the step of selecting the set of distractors from the pool of distractor candidates comprises:

choosing distractor candidates via a random selection process; and creating the set of distractors to include a subset of the chosen distractor candidates.

16. The computer product of claim 13, wherein the step of selecting the set of distractors from the pool of distractor candidates comprises:

choosing distractor candidates that have a greatest cosine similarity score with respect to the correct answer while satisfying at least one threshold; and creating the set of distractors to include a subset of the chosen distractor candidates.

17. The computer product of claim 13, wherein the step of selecting the set of distractors from the pool of distractor candidates comprises:

choosing distractor candidates that have a greatest cosine similarity score with respect to the question while satisfying at least one threshold; and creating the set of distractors to include a subset of the chosen distractor candidates.

*    *    *    *    *